(12) United States Patent
Menne et al.

(10) Patent No.: US 7,500,929 B2
(45) Date of Patent: Mar. 10, 2009

(54) HYBRID DRIVE SYSTEM COMPRISING A HYDRODYNAMIC CLUTCH PARTICULARLY FOR MOTOR VEHICLES

(75) Inventors: Achim Menne, Crailsheim (DE); Heinz Holler, Crailsheim (DE); Volker Zimmermann, Heidenheim (DE); Werner Klement, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 640 days.

(21) Appl. No.: 10/514,256

(22) PCT Filed: Apr. 25, 2003

(86) PCT No.: PCT/EP03/04356

§ 371 (c)(1),
(2), (4) Date: Jun. 20, 2005

(87) PCT Pub. No.: WO03/093045

PCT Pub. Date: Nov. 13, 2003

(65) Prior Publication Data

US 2005/0284674 A1    Dec. 29, 2005

(30) Foreign Application Priority Data

Apr. 29, 2002    (DE) ................. 102 19 080

(51) Int. Cl.
*F16H 3/72*    (2006.01)
(52) U.S. Cl. ......................................................... 475/5
(58) Field of Classification Search ................. 192/3.29, 192/3.3; 180/65.2
See application file for complete search history.

(56) References Cited

U.S. PATENT DOCUMENTS

| | | | | |
|---|---|---|---|---|
| 4,407,398 A | * | 10/1983 | Fiala | 477/5 |
| 4,743,776 A | | 5/1988 | Baehler et al. | 290/31 |
| 5,697,466 A | | 12/1997 | Moroto et al. | 180/65.2 |
| 5,789,823 A | * | 8/1998 | Sherman | 290/47 |
| 6,184,603 B1 | * | 2/2001 | Hamai et al. | 310/75 R |
| 6,478,101 B1 | * | 11/2002 | Taniguchi et al. | 180/65.2 |
| 7,111,698 B2 | * | 9/2006 | Tajima et al. | 180/65.2 |
| 7,191,856 B2 | * | 3/2007 | Morishita et al. | 180/65.2 |

FOREIGN PATENT DOCUMENTS

| | | |
|---|---|---|
| DE | 30 16 620 A1 | 4/1980 |
| DE | 31 38 108 A1 | 11/1983 |

(Continued)

OTHER PUBLICATIONS

German Search Report dated Dec. 5, 2005 based on European Application Serial No. 102 19 080.1-23.

*Primary Examiner*—Dirk Wright
(74) *Attorney, Agent, or Firm*—Ohlandt, Greeley, Ruggiero & Perle, L.L.P

(57) ABSTRACT

A drive system for a motor vehicle is provided. The drive system has a drive assembly, at least one power transmission unit that is coupled with the drive assembly and an electrical machine coupled at least indirectly with the drive assembly. The power transmission unit has at least one starting element with a hydrodynamic clutch and a bridging clutch. A rotor or armature of the electrical machine is arranged coaxially to the hydrodynamic clutch and can be coupled with it in a torsionally rigid manner.

36 Claims, 3 Drawing Sheets

FOREIGN PATENT DOCUMENTS

| | | |
|---|---|---|
| DE | 38 40 658 C1 | 12/1988 |
| DE | 40 07 424 A1 | 10/1990 |
| DE | 42 25 315 A1 | 2/1994 |
| DE | 44 44 242 A1 | 12/1994 |
| DE | 100 36 504 A1 | 7/2000 |
| DE | 100 15 681 A1 | 4/2001 |
| EP | 0 913 598 A1 | 9/1998 |
| EP | 0 913 601 A1 | 9/1998 |
| JP | 2002087080 A | 3/2002 |
| WO | WO 02/085659 | 10/2002 |

* cited by examiner

HYBRID DRIVE SYSTEM COMPRISING A HYDRODYNAMIC CLUTCH PARTICULARLY FOR MOTOR VEHICLES

RELATED APPLICATIONS

This application claims priority in PCT International Application No. PCT/EP03/04356, filed Apr. 25, 2003, and German Application No. DE 102 19 080.1, filed on Apr. 29, 2002, the disclosures of which are incorporated herein by reference.

BACKGROUND OF THE INVENTION

1. Field of the Invention

The invention concerns a drive system, particularly for motor vehicles, specifically with the features taken from the preamble of claim 1.

2. Description of the Related Art

Drive systems, particularly mechanical drive systems with an integrated electrical machine functioning as a starter generator, are known in a plurality of designs. Reference is made by way of example to a compilation of Dr.-Eng. Wolfgang Reick, LuK & Co, Bühl, "Startergenerator im Antriebsstrang" [Starter Generators in the Drive Train"], published at http://www.luk.de/Bibliothek/Vortraege.html. A starter generator of this kind is understood here to refer to an electrical machine, the rotor of which is mounted directly on the crankshaft or else is arranged parallel to the latter and which can work both as a generator and as a motor. The electrical machine is employed for starting the internal combustion engine and, further, as a generator for energy recuperation from the drive system. In particular, the recuperation of energy in, for example, the coasting or decelerating mode is gaining ever increasing importance owing to the constant increase in the number of electrically driven components. In order to provide these functions, a certain dimensioning of the electrical machine is necessary and thus the system cannot be offered at an especially favorable price; therefore, additional functions are being increasingly assigned to this unit. Such additional functions are: start/stop function for soft start, direct start, impulse start, booster, energy recuperation in coasting, active synchronization, and damping. The electrical machine can be disposed here coaxially or eccentrically for the coupling between the internal combustion engine and the drive train, usually a transmission. Depending on the arrangement, the electrical machine is arranged through one or two clutches so that it can be disengaged from the drive train. A design of a starter generator for automatic transmissions with converter may be found on page 53 of the above article. In it, the starter generator is adjoined to the hydrodynamic speed/torque converter. In the structural space designed for the current lockup clutch, only one further second clutch is integrated, which can disengage the motor from the pump case. The first clutch serves here to make a connection between the crankshaft and the rotor and the second clutch represents the usual lockup clutch. If the first clutch is opened, the internal combustion engine can be stopped and the electrical machine will continue to operate. Accordingly, this allows all states that are possible with a two-clutch solution to be provided, that is, particularly the function as a booster and as a starter and the recuperation of energy. An important drawback of the use of a converter in the automatic transmission consists of the fact that, also particularly at low temperatures, in spite of the possibility of the direct start or of an impulse start via the electrical machine, the power transmission via the hydrodynamic converter is thereby very unsatisfactory, especially in low gear. The advantages that ensue through the use of the starter generator are in turn eliminated by the poor cold start behavior in this state, which, particularly for use in automatic transmissions or automated shift transmissions, can be problematic at corresponding latitudes with at times very low temperatures. Further, the complete unit consisting of electrical machine and starting component has a very wide construction in the axial and radial directions. The necessary structural space is defined here essentially by the structural space required for installing the hydrodynamic speed/torque converter and thus the still remaining possibilities available for integration of the electrical machine. A further important drawback consists in the nonexistence of a possibility for adjusting the power input and for control of the power input of the hydrodynamic speed/torque converter. Accordingly, in all operating states, the maximum power possible is immediately taken up by the latter and this can lead, under certain circumstances, to an undesired driving response during starting operation and possibly also to a sudden stalling of the driving engine.

SUMMARY OF THE INVENTION

The invention is therefore based on the object of further developing a drive system of the type mentioned in the beginning in such a way that the drawbacks cited are avoided. Specifically, a solution with improved cold start behavior is to be proposed. The solution should further be suitable for any kind of transmission, particularly automated shift transmissions, shift transmissions, and CVTs and it should be characterized by a reduced structural space in the axial direction and also in the radial direction compared to designs of the prior art.

The solution of the invention is characterized by the features of claim 1. Advantageous embodiments are presented in the subclaims.

A drive system, particularly for motor vehicles, with a drive assembly and at least one power transmission unit that is coupled with the drive assembly and one electrical machine that is coupled at least indirectly with the drive assembly is designed in accordance with the invention in such a way that the power transmission unit is free of a hydrodynamic speed/torque converter and instead comprises a hydrodynamic clutch, which is adjoined to the electrical machine. The electrical machine is arranged here coaxially to the hydrodynamic clutch and can be connected to it in a torsionally rigid manner. This means that the rotor is connected in a torsionally rigid manner to the hydrodynamic clutch either constantly or else it is only at times connected to it. Involved in the case of the hydrodynamic clutch is a hydrodynamic component that is characterized by the presence of two blade wheels, a primary blade wheel and a secondary blade wheel, which, as a rule, form with each other a torus-shaped operating chamber. Here, the hydrodynamic clutch is free of further blade wheels, such as, for example a guide wheel. The function of the hydrodynamic clutch consists in power transmission between the primary blade wheel and the secondary blade wheel when their moments of inertia are identical, it being possible with this component, in contrast to the hydrodynamic speed/torque converter, to make only one speed conversion.

The inventors have recognized that, in order to eliminate the problems of a design in accordance with the prior art, the hydrodynamic component in the form of the hydrodynamic speed/torque converter can be replaced by a hydrodynamic clutch, because the latter, especially at low temperatures, that is, in the cold state, is characterized by an appreciably lower power input than the hydrodynamic converter. Further, the use of a hydrodynamic clutch offers the advantage that the required design length in the axial direction as well as in the radial direction can be minimized, it being possible to enhance this effect still further by the construction of diagonal blading. The lower power input on starting with a cold operating medium is made possible by the creation of a free flow toward the converter with forced flow in the torus-shaped operating chamber.

A further important advantage of the system of a combination consisting of a hydrodynamic starting element in the form of a hydrodynamic clutch, which is coupled with an electrical machine functioning as a starter generator, the rotor or armature of this electrical machine being arranged coaxially to the hydrodynamic clutch, consists in additionally acquired structural space both in the radial and in the axial directions, which can be used for other components. This results in absolutely efficient integration advantages compared to a solution with a hydrodynamic speed/torque converter, by means of which, in particular, the increased demands on the increasingly reduced structural space available for the use of drive systems for vehicles can be met.

According to an advantageous embodiment, the hydrodynamic clutch can be operated at least with partial filling. This means that, for full operating capability, there does not have to be a complete filling and, further, with the hydrodynamic clutch, it is possible to actively control or to regulate the speed on the driving side, that is, of the part coupled with the secondary blade wheel, and/or the speed of the parts of the drive train coupled with the primary blade wheel. This offers the advantage that it is possible to respond here to different power demands. For this purpose, the hydrodynamic clutch is preferably controllable, the control occurring through the change in the filling ratio. In accordance therewith, a device for influencing the filling ratio of the hydrodynamic clutch is provided. This can be designed in a variety of ways. Here, only a design of a hydrodynamic clutch with a closed circuit, corresponding to the flow circuit adjusted in the torus-shaped operating chamber, which is conveyed outside of the torus-shaped operating chamber and is constructed in a pressure-tight manner, is mentioned as a representative example. The closed circuit is coupled here with a supply source of operating medium, this coupling also being made in a pressure-tight manner. Preferably, the operating medium source is designed in the form of an operating medium pan, the change in the filling ratio being undertaken through the influence of applied pressure on the operating medium level. As an operating medium pan, it is possible to use here a separate supply system of operating medium, such as, for example, an oil pan, when the hydrodynamic clutch as a starting component is integrated in a transmission modular unit, the operating medium pan of the transmission modular unit, or an operating medium pan separately assigned to the starting component of the hydrodynamic clutch. Besides the controllability of the hydrodynamic clutch, it can also be integrated into regulating operations; for example, a regulation of the filling ratio and thus of the power input can occur.

The hydrodynamic clutch functions as a starting component and is coupled, either directly or, for example, through the intermediate connection of a flywheel, with the drive assembly, which, as a rule, is designed in the form of an internal combustion engine. The coupling occurs here via the primary blade wheel. In a plurality of designs, the latter is connected in a torsionally rigid manner with a so-called primary wheel shell, which surrounds the secondary blade wheel at least in part in the axial direction and in the circumferential direction. The starting element forms a starting unit with the bridging clutch. In terms of its arrangement in space, this starting unit is, as a rule, placed after a transmission. Both of these—the starting unit and the transmission—then form a complete modular unit. Here, for solutions as a separate prefabricated module, the starting unit can be constructed with its own casing, which is flange-mounted on the transmission housing in order to form a complete modular unit consisting of starting unit and transmission. This solution is chosen, above all, for starting elements in the form of hydrodynamic clutches with additional functions and with additional elements allocated to it. In this case, the starting unit, as a module, can be inspected independently. For the design of the starting unit as an independent module, the electrical machine is integrated into it as well. Another possibility consists in also integrating the combination consisting of starting unit and electrical machine into the housing of the transmission, the transmission housing being constructed in this case with a compartment into which the prefabricated module—in this case, as a rule, without its own casing—can be inserted and with which the speed/torque converter units of the transmission can be coupled. The term transmission is to be understood very generally and includes any kind of speed/torque converter units which are connected downstream to a starting unit and can be coupled to it. For use in motor vehicle construction, the speed/torque converter units of the transmission are formed, as a rule, from mechanical speed/torque converter units. As a rule, these involve output stages, which, for example, can be formed from planetary gearsets or spur wheel gearsets. Also conceivable are constructions of the transmission as an infinitely variable transmission, in which, here, as a rule, chain and belt transmissions are put to use. In this way, it is also possible to combine the possibilities of infinitely variable power transmission with those of a fixed transmission ratio. The concrete design of the transmission as well as of the combination and constructional amalgamation of starting unit with integrated starter generator and transmission lies here in the judgement of the person skilled in the art and depends on the concrete case of application and the constraints ensuing therefrom.

As a rule, an engaging and disengaging clutch is arranged parallel to the hydrodynamic clutch as a starting element and serves for bridging. This bridging is realized here through the torsionally coupling between the primary blade wheel and the secondary blade wheel. This coupling involves, as a rule, a friction clutch, preferably a disk clutch.

For the design of the torsionally rigid coupling between the rotor or armature of the electrical machine and the hydrodynamic clutch, there are a multitude of possibilities. According to a first design, the rotor or armature of the electrical machine is coupled in a torsionally rigid manner with the primary blade wheel, preferably with the primary blade wheel shell. The rotor or armature of the electrical machine can thereby form a constructional unit with the primary blade wheel shell, the primary blade wheel shell and the armature being designed either as integral modular units or else being coupled to each other via means for torsionally rigid connection. In both cases, the connection between the armature or rotor of the electrical machine and the primary blade wheel of the hydrodynamic clutch is free of means for alternative coupling or decoupling from each other in the form of, for example, engaging and disengaging clutches. This means that there is always a torsionally rigid connection between the armature or rotor of the electrical machine and the primary blade wheel of the hydrodynamic clutch. The connection between the connection of the rotor of the electrical machine with the primary blade wheel of the hydrodynamic clutch and the drive assembly can a) be free of means for alternative coupling or decoupling of the drive assembly from the connection between the electrical machine and the primary blade wheel or else b) provide for means for the alternative coupling or decoupling of the connection between the electrical machine and primary blade wheel and the drive assembly.

In the former case, the rotor of the electrical machine is always in driving connection with the drive assembly, particularly with the crankshaft in the case of construction as an internal combustion engine. This means that, in this state, a starting of the internal combustion engine is possible. Further, the electrical machine can also assist for a short time the internal combustion engine and thus act as a booster. The hydrodynamic clutch is preferably emptied during the starting operation. In the booster function mode, it is filled. In analogy, the bridging clutch is preferably opened during the starting operation.

In coasting operation, power transmission occurs from the output drive, that is, as a rule, via the transmission to the internal combustion engine, and a portion of the power can also be converted via the electrical machine, which, in this case, is operated as a generator, into electrical power and made available to the on-board electrical system. Furthermore, in normal operation, that is, for power transmission from the internal combustion engine to the output drive, corresponding to the driving of the electrical machine when the rotor is coupled, the electrical machine takes up power and, in this case, is operated as a generator and makes available the converted electrical power to the on-board electrical system or to an energy storage device. In coasting operation, in order to use completely the power introduced via the drive system for conversion into electrical power, the deceleration losses by the internal combustion engine can be minimized through the solution described under b) by interrupting the connection between the electrical machine and the driving engine. The power fraction that otherwise is used up through the internal friction of the internal combustion engine, when there is a constant connection of the rotor of the electrical machine with the internal combustion engine in coasting operation, can, in this case, then also be used additionally for conversion into electrical power.

For solutions with constant torsionally rigid connection between the primary blade wheel of the hydrodynamic clutch and the rotor of the electrical machine, there results, for the electrical machine in the case of power transmission between the internal combustion engine and the resulting mechanical power branch when the hydrodynamic clutch is bridged, the same functional possibilities, namely, assisting the internal combustion engine and, further, in coasting operation, the use of the energy introduced via the output drive into the drive train for conversion into electrical power. In this case, the hydrodynamic clutch can remain filled or else be emptied, the first possibility being employed preferably, because, here, it is possible to dispense with prolonged filling times.

According to a further development, means for alternative coupling and decoupling, preferably in the form of a an engaging and disengaging clutch, are provided between the rotor of the electrical machine and the primary blade wheel of the hydrodynamic clutch. This possibility offers the advantage that, here, no complete separation of the drive train from the internal combustion engine is necessary for breaking the connection between the rotor of the electrical machine and the drive assembly, but rather the coupling between the drive assembly and the hydrodynamic clutch or bridging clutch can remain in existence. However, here, too, for energy recuperation in coasting operation, the power fraction due to the internal combustion engine is to be registered as lost power.

Further, for decoupling of the drive assembly between the drive assembly and the hydrodynamic clutch, there exists the possibility of providing a device for alternative interruption or realization of the power flow between the drive assembly and the hydrodynamic clutch as well as the electrical machine.

All devices for coupling and decoupling are preferably designed in the form of engaging and disengaging clutches, particularly in the form of disk clutches.

According to a second solution approach, the electrical machine can be connected in a torsionally rigid manner with the secondary blade wheel. This possibility of torsionally rigid connection can be afforded in addition to the possible torsionally rigid coupling with the primary blade wheel or else it can be provided as a second separate possible solution. In the first-mentioned case, the rotor of the electrical machine is coupled in a torsionally rigid manner with the input of the bridging clutch and the primary blade wheel. For coupling with the input of the bridging clutch, there exists nonetheless a torsionally rigid connection between the rotor of the electrical machine and the primary blade wheel, whereas the rotor is mechanically decoupled from the secondary blade wheel by the bridging clutch. Only when the bridging clutch is engaged is the rotor of the electrical machine connected in a torsionally rigid manner both with the primary blade wheel and with the secondary blade wheel. For separation of the rotor from the driving engine, either a) a device for alternative coupling or decoupling of the rotor from the primary blade wheel in the connection between the primary blade wheel and the rotor and/or b) a device for alternative coupling or decoupling of the torsionally rigid connection of rotor and primary blade wheel from the driving engine is provided. Here, the variant b) can also be combined with a). The function of the bridging clutch is then assumed in the case mentioned under a) by both clutches, the one situated in front of the rotor and the one situated in back of the rotor.

According to the second solution approach, the rotor is connected in a torsionally rigid manner only with the secondary blade wheel, it being possible for this connection to be characterized by a direct, torsionally rigid coupling or else by the provision of means for the alternative coupling and decoupling of the rotor from the secondary blade wheel. In both cases, it is possible here, too, for the electrical machine to assume the function of the starter for the drive assembly and, in addition, as a booster, to assist at times the driving engine. For optimal energy recuperation, the drive assembly can be decoupled from the electrical machine, for example, by means of emptying the hydrodynamic clutch and simultaneous opening of the bridging clutch or else through the provision of a further clutch between the starting unit and the drive assembly.

Under a further aspect of the invention, means for vibrational damping are assigned to the starting unit. These can be arranged here at any site in the drive system between the drive assembly and the transmission or they can be arranged after the secondary blade wheel.

In regard to the electrical machines used, there exist no restrictions for the combination of the starting unit with the function of a starter generator. Conceivable are all conventionally known electrical machines, synchronous machines and asynchronous machines, as well as synchronous machines with transverse flow guide.

The solution of the invention is suitable for use in drive systems with shift transmissions, particularly in automatic transmissions or automated shift transmissions.

BRIEF DESCRIPTION OF THE DRAWINGS

The solution of the invention is explained below on the basis of figures. Shown therein in detail is the following.

DESCRIPTION OF THE INVENTION

Figure 1:
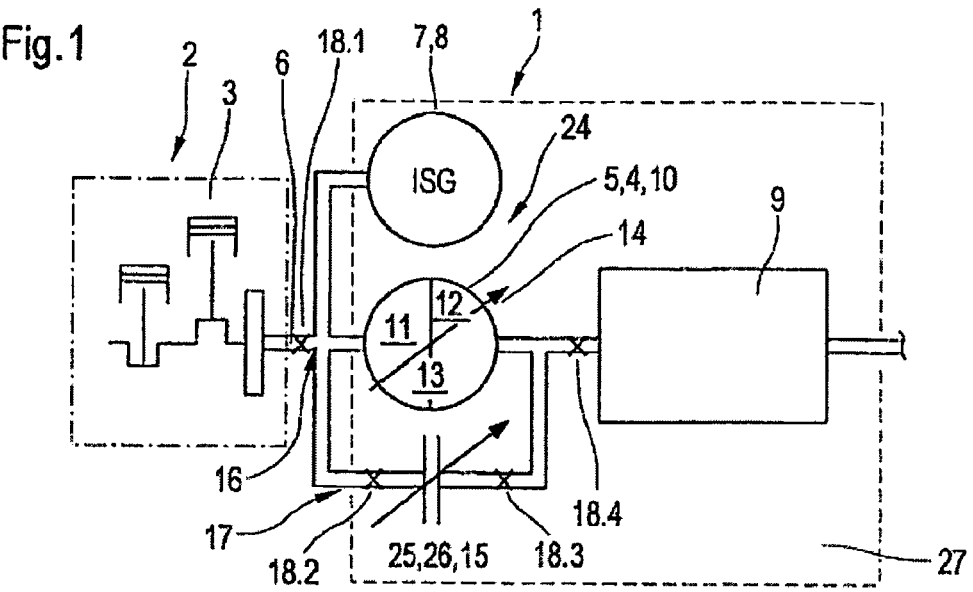
FIG. 1 illustrates in a schematically greatly simplified depiction a first embodiment of a starting unit of the invention in a drive system, on the basis of an excerpt from this, with torsionally rigid connection between the rotor of the electrical machine and the primary blade wheel.

FIG. 1 illustrates in a schematically greatly simplified depiction a first possible embodiment of a drive system 1, designed in accordance with the invention, on the basis of an excerpt from it. The drive system 1 comprises a drive assembly 2, which is designed for use in vehicles preferably as an internal combustion engine 3. Coupled with this is at least one power transmission unit 4, this comprising, in accordance with the invention, a starting unit 24, which in turn comprises a starting element 10 in the form of a hydrodynamic clutch 5. This further has a bridging clutch 25 in the form of an engaging and disengaging clutch 26, which is situated parallel to the starting element 10. Further, an electrical machine 7 is coupled with the drive assembly 2, particularly its drive shaft 6. This electrical machine involves a so-called starter generator, which is understood to mean an electrical machine whose armature or rotor 8 is coupled in a torsionally rigid manner with the drive shaft 6 at least as little indirectly as possible, that is, directly, or else through further transmission elements and that can be operated both as generator and as motor. This electrical machine 7 accordingly replaces, as its basic function, a starter and a generator in the drive system.

The drive system 1 further comprises, according to FIG. 1, at least one transmission 9, which is situated after the hydrodynamic clutch 5. For the embodiment depicted in FIG. 1, the hydrodynamic clutch 5 functions as starting element 10, which, as indicated by the broken line in FIG. 1, can be amalgamated with the transmission 9 into a modular unit 27 or else is integrated in the transmission 9. The starting unit 24 and the transmission 9 form, in the case depicted, the modular unit 27. For illustration of the individual coupling possibilities for the electrical machine 7, the hydrodynamic clutch 5, as starting element 10, and the transmission 9 are depicted separately. The modular unit 27 comprising the two is depicted with a broken line. The hydrodynamic clutch 5 comprises a primary wheel 11 and a secondary wheel 12. The hydrodynamic clutch 5 is free of a guide wheel. The primary blade wheel 11 and the secondary blade wheel 12 form a torus-shaped operating chamber 13 with each other. For power transmission, the hydrodynamic clutch is at least partially filled and preferably completely filled. For control of the power transmission and particularly of the power input, the filling ratio can be varied. In accordance therewith, a device 14, indicated here only by an arrow, is adjoined to the hydrodynamic clutch 5 for control of the filling ratio. In this regard, there exist, according to the prior art, a plurality of possibilities, which, however, will not be dealt with in detail separately here.

In accordance with the invention, the rotor or armature 8 of the electrical machine 7, in a first solution variant, is coupled in a torsionally rigid manner with the primary blade wheel 11 of the hydrodynamic clutch 5. This connection is designated by reference 16. Further, the primary blade wheel 11 is connected at least indirectly in a torsionally rigid manner with the drive shaft 6 of the drive assembly 2; according to FIG. 1, it is connected directly with the latter. The connection between the rotor 8 and the primary blade wheel 11 is designated by reference 16. This is constantly present. Accordingly, in the case depicted, the starter generator or the electrical machine 7 is always coupled with the drive assembly 2 and the power transmission unit 4. Provided for decoupling of the electrical machine 7 from the transmission 9 is a device 15 for interrupting the power flow between the electrical machine 7 and the transmission 9 for power transmission with circumvention of the hydrodynamic clutch. This device involves, as a rule, an engaging and disengaging clutch. This function is assumed here by the bridging clutch 25. For starting the driving engine 2 here, the bridging clutch 25 is preferably opened. The hydrodynamic clutch 5 can already be partially filled. On account of the good cold start behavior of the hydrodynamic clutch, it does not have a negative effect on the starting operation. Further, there exists the possibility, besides making use of the electrical machine 7 for active reduction of rotational irregularities, of also providing, in addition, a device for the damping of vibrations 17, preferably a torsional vibration damper. This is not depicted in detail, but the possible arrangements thereof, references 18.1 to 18.4, are shown by a cross in FIG. 1. The torsional vibration damper 18.1 can here be arranged, in accordance with an especially advantageous embodiment, between the drive assembly 2 and the connection 16 of the electrical machine 7 with the primary blade wheel 11 of the hydrodynamic clutch 5. In this case, the irregularities of the drive assembly 2 are not transmitted into the drive train. A further possibility consists of the arrangement between the electrical machine 7 and the transmission 9, it being possible here for the arrangement to be made in front of as well as behind the bridging clutch 25. These two positions are designated by references 18.2 and 18.3. The fourth possibility, designated by reference 18.4, exists in the arrangement of the torsional vibration damper in front of the transmission 9; that is, it is situated after both the starting unit 24 and the electrical machine 7.

For the configuration depicted in FIG. 1, the electrical machine 7 is always coupled in a torsionally rigid manner with the internal combustion engine 3. This means that, in this case, when the internal combustion engine 3 is set into operation, the electrical machine 7 always takes up a power fraction, corresponding to its actuation, and is operated as a generator. This allows constantly the provision of electrical energy for the on-board electrical system of the vehicle, for example, via the internal combustion engine 3. In the decelerating mode, that is, when power flow is regarded as occurring from the drive wheels to the internal combustion engine, there exists the possibility, by means of the bridging clutch 25, when the clutch 5 is emptied, of decoupling the transmission 9 from the starter generator, that is, from the electrical machine 7. In this case, however, no electrical power can be obtained from the decelerating power. When the hydrodynamic clutch is filled, the power flow occurs primarily via the starting unit 24, particularly the hydrodynamic clutch 5, to the internal combustion engine 3; however, here, too, only the rotor 8 is coupled in motion and the decelerating power is distributed both to the drive assembly 2 and to the electrical machine 7.

For the configuration depicted in FIG. 1, the electrical machine 7 is arranged coaxially to the starting element 10, that is, to the hydrodynamic clutch 5, and thus also to the drive assembly 2. This also holds true for the embodiment according to FIG. 2, which is provided with another additional device for interrupting the power flow between the connection 16 of the starter generator 7 and primary blade wheel 11 of the hydrodynamic clutch 5 and the drive assembly 2. This device is designated by reference 19. It, too, comprises preferably an engaging and disengaging clutch. The basic construction of the drive system 1 otherwise corresponds to that described in FIG. 1, for which reason the same reference numbers are used for the same elements. The additional possibility of interrupting the power flow between the drive assembly 2 and connection 16 of the electrical machine 7 and the primary blade wheel 11 of the hydrodynamic clutch 5 creates the possibility of a complete decoupling of the drive assembly 2 from the remaining drive train. Accordingly, this affords still another arrangement possibility for a torsional vibration damper, which is designated here by reference 18.5. The torsional vibration damper here is arranged between the clutch 19 and the drive assembly 2. The electrical machine 7 is accordingly arranged between two clutches, the clutch 19 and the bridging clutch 25. The possibility is thus afforded of connecting the electrical machine either with the drive assembly 2 and/or with the transmission 9. This makes it possible, when the motor is warm, to start directly, that is, with a closed coupling 19, when the drive assembly 2 is designed as an internal combustion engine 3. At low temperatures, when the decelerating moment of the drive assembly 2, particularly of the internal combustion engine, is very large, preferably both clutches, the clutch 19 and the bridging clutch 25, are first opened. When this is done, initially the armature or rotor 8 of the electrical machine is highly accelerated and only then is the first clutch 19 closed. The drive shaft 6 is then accelerated and the drive assembly 2, that is, the internal combustion engine, starts all of a sudden. A further decisive advantage of this solution, particularly the possibility of decoupling the electrical machine 7 from the internal combustion engine 3, consists of an improved recuperation of the braking energy, because the fraction that is eliminated when the drive train and the electrical machine 7 are coupled directly with the internal combustion engine 3 owing to internal friction in the latter, due to the possibility of decoupling of the drive assembly 2 from the electrical machine 7, can be supplied to the latter as well. In the coasting mode in higher gears, therefore, the device 15 is preferably always actuated in such a way that a coupling between the electrical machine 7 and the speed/torque converter unit 9 exists. The hydrodynamic clutch 5 is preferably emptied.

The starting unit 24 and the transmission are amalgamated here to form the modular unit 27. The latter can also further include the clutch 19. Also conceivable, however, is situating the clutch 19 upstream as a separate device of the modular unit 27.

In regard to the kind of combination of the starting unit 24 and the transmission 9, there exist no restrictions, that is, in regard to the integration of the starting unit 24 into the transmission 9, particularly into a part of the housing compartment of the transmission 9 or through flange mounting on the housing. In both cases, a complete modular unit 27 is formed.

Figure 2:
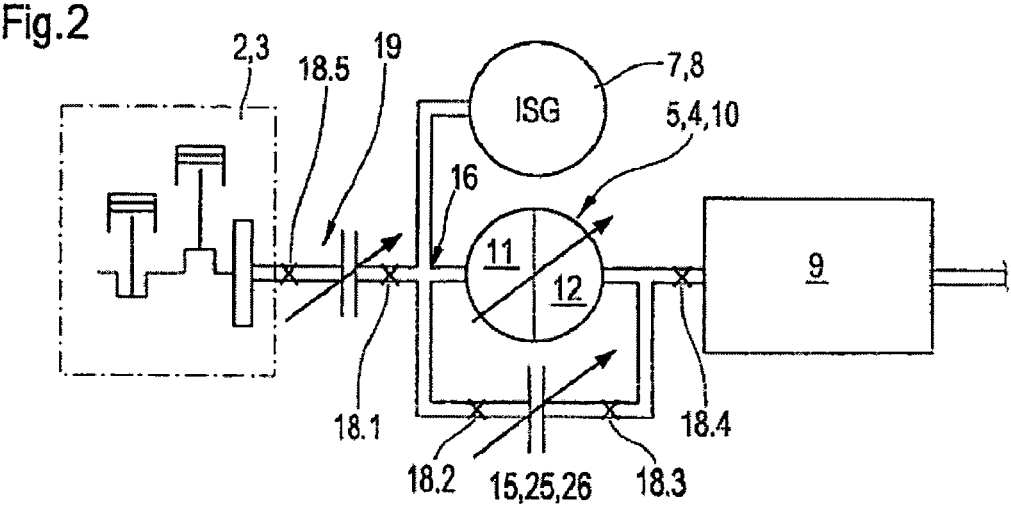
FIG. 2 illustrates a further development of an embodiment according to FIG. 1 with the additional possibility for the decoupling of the drive assembly from the torsionally rigid connection between the rotor and the primary blade wheel.

In the two embodiments according to FIGS. 1 and 2, the electrical machine 7 can also additionally be used as a booster to assist the drive assembly 2 in providing power by feeding power into the drive system 1.

Figure 3:
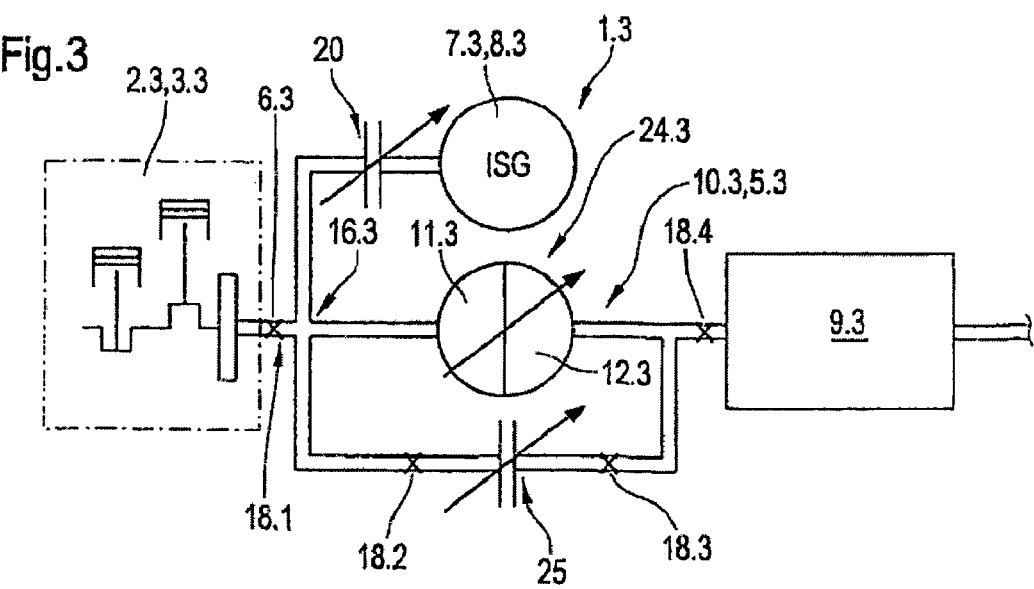
FIG. 3 illustrates a further development of an embodiment according to FIG. 1 with additional possibility for the decoupling of the rotor from the primary blade wheel.

FIG. 3 illustrates a further modification of a drive system 1, designed in accordance with the invention, according to FIG. 1. Here, the rotor 8.3 of the electrical machine 7.3 is not continuously, that is, not constantly, coupled in a torsionally rigid manner with the primary blade wheel 11.3. The connection 16.3 can accordingly be broken as chosen. Provided for this purpose is a device 20 for the alternative coupling or decoupling of the rotor of the primary blade wheel 11.3. Said device is designed preferably also in the form of an engaging and disengaging clutch. The function and the remaining construction of the drive system 1.3 is configured in analogy to that described in FIG. 1, although, in addition, the power flow between the drive assembly 2.3 and the electrical machine 7.3 can be interrupted independently of the power transmission between the drive assembly 2.3 and the starting element 10.3 or between the bridging clutch 25 and the transmission; that is, only at times is electrical power made available via the electrical machine 7.3, depending on the actuation of the device 20. The arrangement possibilities for integration of a torsional vibration damper correspond to those described in FIG. 1 and are designated by references 18.1, 18.2, 18.3, and 18.4.

Figure 4:
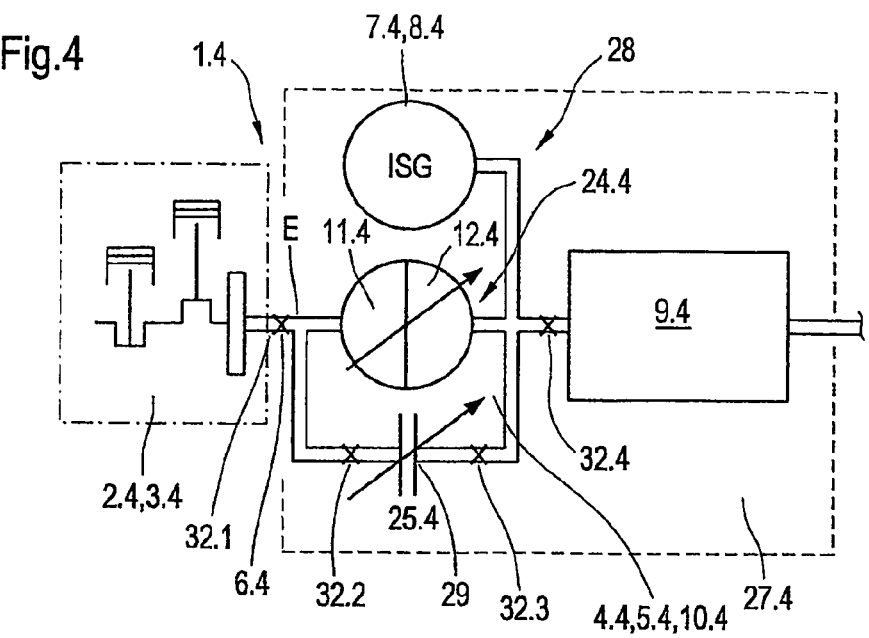
FIG. 4 illustrates in a schematically greatly simplified depiction a second embodiment of a starting unit of the invention in a drive system, on the basis of an excerpt from it, with torsionally rigid connection between the rotor of the electrical machine and the secondary blade wheel.

FIG. 4 illustrates another alternative embodiment. The drive system 1.4 comprises likewise a drive assembly 2.4 in the form of an internal combustion engine 3.4, which is coupled with a power transmission unit 4.4, comprising a starting unit 24.4, with a starting element in the form of a hydrodynamic clutch 5.4. The hydrodynamic clutch 5.4 is here an integral component of a modular unit 27.4, comprising a transmission 9.4, but can be situated upstream of the transmission 9.4 when it functions as starting unit 10.4 and is designed as a separate unit and only be flange-mounted on the housing of the transmission 9.4. In FIG. 4, for illustration of the attachment possibilities, the hydrodynamic clutch 5.4 and the transmission 9.4 are depicted as separated in space. Here, too, the electrical machine 7.4 is arranged coaxially with respect to the hydrodynamic clutch 5.4 and accordingly, when it is coupled with the internal combustion engine 3.4, coaxially with respect to the latter. The primary wheel 11.4 of the hydrodynamic clutch 5.4 is coupled in a torsionally rigid manner with the drive shaft 6.4 of the drive assembly 2.4. The secondary wheel 12.4 is connected in a torsionally rigid manner with the speed/torque converter unit. When the hydrodynamic clutch 5.4 is integrated into the modular unit 27.4, the primary blade wheel 11.4 or the element coupled in a torsionally rigid manner with the latter here forms the transmission input shaft E of the modular unit 27.4. The electrical machine 7.4, particularly the armature or rotor 8.4, is coupled here in a torsionally rigid manner with the secondary wheel 12.4 and thus also with the transmission 9.4. The starting unit 24.4 comprises here, too, a bridging clutch 25.4, which is engaged parallel to the hydrodynamic clutch 5.4. The electrical machine 7.4 is connected here between the starting unit 24.4 and the transmission 9.4. The rotor 8.4 of the electrical machine 7.4 is always coupled here in a torsionally rigid manner with the secondary blade wheel 12.4 and the output 29 of the bridging clutch 25.4. A coupling of the rotor 8.4 with the drive assembly 2.4 is therefore possible only when the hydrodynamic clutch 5.4 is filled, such as, for example, during the starting operation, or else when the bridging clutch 25 is closed. For the purpose of optimal energy recuperation in the coasting mode, the hydrodynamic clutch 5.4 is preferably completely, but at least partially, emptied and the bridging clutch 25.4 is opened. In this way, it is possible to produce a complete decoupling of the internal combustion engine 3.4 from the remaining power transmitting units, particularly the transmission 9.4 and the complete modular unit 27.4. The total power delivered via the transmission 9.4 in the direction of the drive assembly 2.4 can thus be supplied to the electrical machine 7.4 and converted into electrical power.

When the hydrodynamic clutch 5.4 is emptied, power transmission still occurs only from the drive assembly 2.4 to the transmission 9.4 with circumvention of the hydrodynamic clutch 5.4 and, on account of the torsionally rigid coupling 28 of the armature or rotor 8.4 of the electrical machine 7.4 with the secondary blade wheel 12.4, it is possible to tap a power fraction of the total power made available by means of the drive assembly 2.4 for the generation of electrical power for the on-board electrical system. If, in the embodiment according to FIG. 4, an emptying of the hydrodynamic clutch 5.4 is still required for the purpose of energy recuperation, during which, however, venting losses due to the coupled motion of the secondary blade wheel 12.4 are registered, it is possible, through provision of another device 23 for the alternative interruption of the power flow between the drive assembly 2.5 and the hydrodynamic clutch 5.5, to achieve a complete decoupling of the drive assembly 2.5. In this case, even when the hydrodynamic clutch 5.5 is filled, as depicted in FIG. 5, it is possible, through the bridging, that is, the synchronization between the primary blade wheel 11.5 and the secondary blade wheel 12.5, to feed all of the power delivered to the drive train from the wheels to the electrical machine 7.5 for the generation of electrical power.

Figure 5:
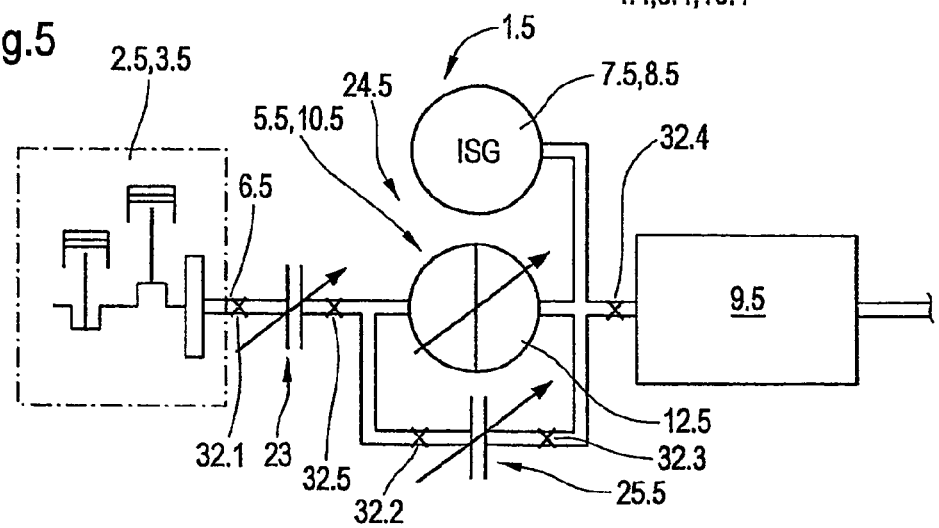
FIG. 5 illustrates a further development of an embodiment according to FIG. 4 with additional possibility for the decoupling of the drive assembly from the torsionally rigid connection between the rotor and the secondary blade wheel.

Also for the two solutions depicted in FIGS. 4 and 5, there result different arrangement possibilities of a torsional vibration damper. These are depicted here by references 32.1 to 32.4 for FIG. 4 and 32.1 to 32.5 for FIG. 5. The position 32.1 of the torsional vibration damper is provided by the arrangement between the drive shaft 6.4 or 6.5 and the hydrodynamic clutch 5.4 or 5.5, respectively, in front of the bridging clutch. Here, the arrangement can be made directly behind or at the drive shaft 6.4 or 6.1, respectively, but also in front of the bridging clutch 25.4 or 25.5, respectively. The arrangement 32.2 is made directly in front of the bridging clutch. Further, according to reference 32.3, the torsional vibration damper can be arranged behind the bridging clutch 25.4 or 25.5 in front of the electrical machine 7.4 or 7.5, respectively, and, according to reference 32.4, behind the bridging clutch 25.4 or 25.5 and after the electrical machine 7.4 or 7.5, respectively. The position 24.5 in FIG. 4 illustrates an additional arrangement behind the device 23 in the form of an engaging and disengaging clutch and in front of the bridging clutch 25.5

For the solution depicted in FIG. 5, the device 23, as a disengaging clutch, can be a part of the starting unit 24.5 and possibly of the modular unit 27.5 formed from the starting unit 24.5 and the transmission 9.5. Also conceivable, however, is the constructional separation of the device 23 and the modular unit 27.5. In this case, the device is arranged in front of the modular unit 27.5. This holds true by analogy also for the torsional vibration damper 32.1 in FIGS. 4 and 5 and 32.2 in FIG. 5.

Figure 6:
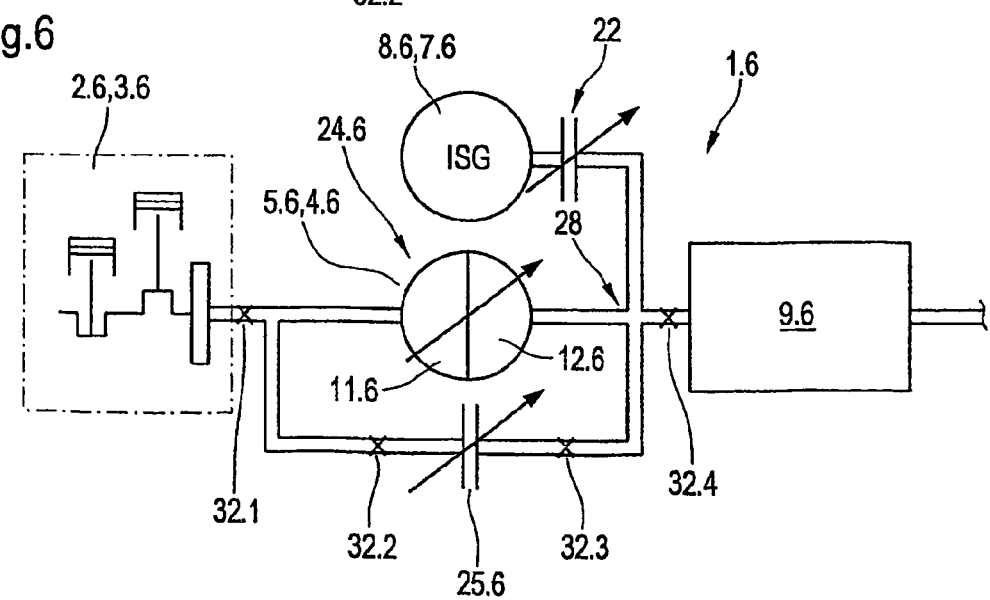
FIG. 6 illustrates a further development of an embodiment according to FIG. 4 with additional possibility for the decoupling of the rotor from the secondary blade wheel.

FIG. 6 illustrates a modification of an embodiment according to FIG. 4. The basic structure corresponds to that in FIG. 4, for which reason the same reference numbers are used for the same elements. Provided here, in addition, is a device 22 for the alternative coupling or decoupling of the rotor 8.6 of the electrical machine 7.6 from the secondary blade wheel 12.6. Said device is designed preferably in the form of an engaging and disengaging clutch and is arranged in the connection 28 between the electrical machine 7.6 and the secondary blade wheel 12.6. The mode of operation corresponds essentially to that described in FIG. 4 and is at times disabled by the complete decoupling of the electrical machine 7.6 from the drive train and thus the drive assembly 2.6 as well as the hydrodynamic clutch 5.6. The arrangement possibilities for the torsional vibration dampers, 32.1 to 32.4, correspond to those in FIG. 4.

Also when the rotors 8.4, 8.5, and 8.6 are coupled with the secondary blade wheel 12.4, 12.5, or 12.6, respectively, there exists the possibility of making use of the electrical machine 7.4, 7.5, or 7.6, respectively, as a booster, that is, for making available additional energy to the drive train, and, in this case, for an embodiment according to FIG. 6, the clutch 22 has to be closed. Further, the electrical machine 7.4, 7.5, or 7.6 can be employed for starting the drive assembly 2.4, 2.5, or 2.6, respectively. In the coasting mode, when there exists a coupling of the rotor 8.4, 8.5, or 8.6 with the secondary blade wheel 12.4, 12.5, or 12.6, respectively, or the transmission 9.4, 9.5, or 9.6, respectively, power supplies into the on-board electrical system or into an energy storage device are possible.

For reasons of clarity in FIGS. 5 and 6, a separate depiction of the modular unit 27 corresponding to FIG. 4 was dispensed with.

Figure 7:
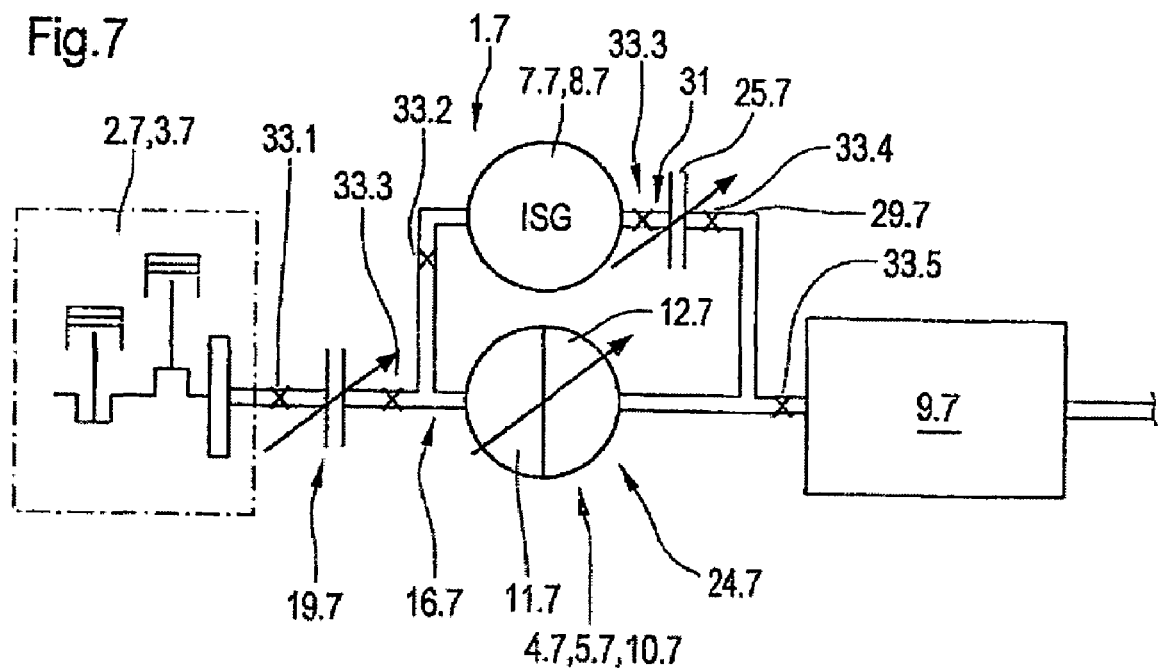
FIG. 7 illustrates in schematically greatly simplified depiction a first embodiment of a combination consisting of a coupling of the rotor with the primary blade wheel and the secondary blade wheel.
Figure 8:
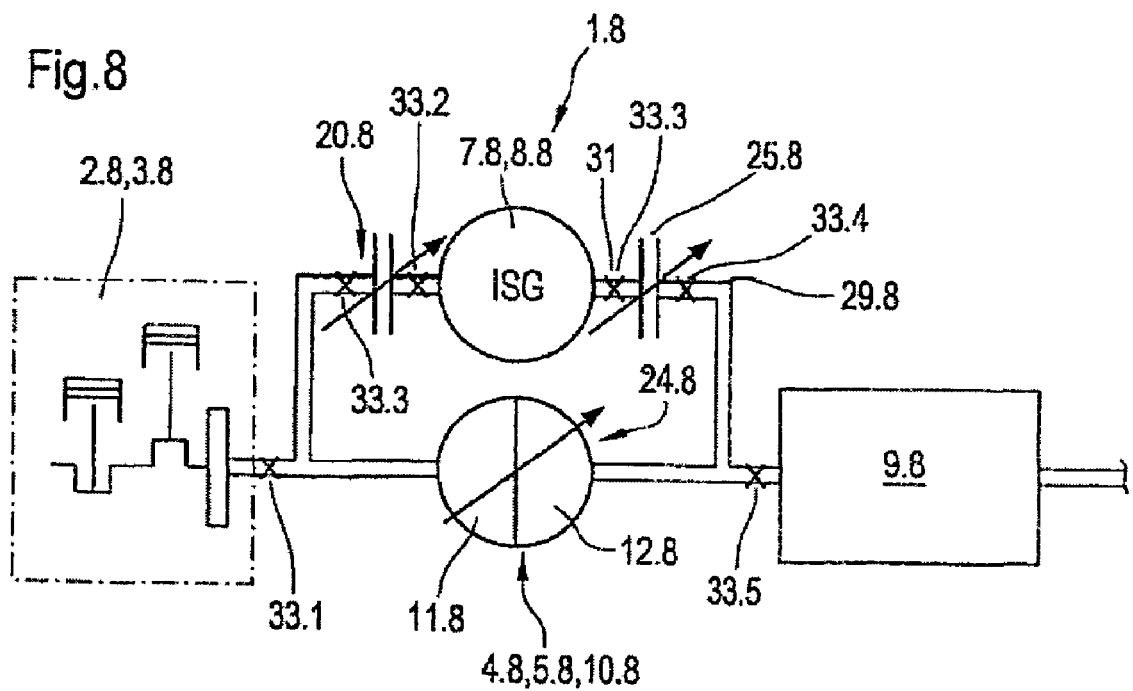
FIG. 8 illustrates in a schematically greatly simplified depiction a second embodiment of a combination consisting of coupling of the rotor with the primary blade wheel and the secondary blade wheel.

FIGS. 7 and 8 illustrate another, third possibility for the attachment of the electrical machine 7 to the starting unit 24. The basic structure of the drive system, with the drive assembly 2, the starting unit 24, and the subsequently arranged transmission 9 and with the provision of a bridging clutch 25, which is engaged parallel to the hydrodynamic clutch 5, corresponds to that described in FIGS. 1 to 6. In these embodiments according to FIG. 7 and FIG. 8, however, the electrical machine 7 is arranged in the parallel power branch 30, in which the bridging clutch 25 is arranged. The rotor 8.7 of the electrical machine 7.7, according to FIG. 7, is connected in a torsionally rigid manner directly, that is, continuously, with the primary blade wheel 11.7, the connection being designated by reference 16.7. Further, the rotor 8.7 is coupled in a torsionally rigid manner with the input 31 of the bridging clutch 25.7. The output 29.7 of the bridging clutch 25.7 is connected with the secondary blade wheel 12.7 of the hydrodynamic clutch 5.7. For separation of the electrical machine 7.7 from the drive assembly 2.7, a device 19.7 for alternative coupling or decoupling of the connection 16.7 with the drive assembly 2.7, which is designed, for example, in the form of an engaging and disengaging clutch, is provided. This solution makes possible, when the coupling 19.7 is opened in the coasting mode, independent of the power transmission via the hydrodynamic clutch 5.7 or via the bridging clutch 25.7, a complete decoupling of the drive assembly 2.7 from the drive train, so that the power supplied to the electrical machine 7.7 in the coasting mode is not minimized by the decelerating losses of the driving engine 2.7. For the embodiment according to FIG. 8, a device 20.8 for the alternative coupling or decoupling of the rotor 8.8 from the primary blade wheel 11.8 is integrated in the connection 16.8, so that, although, here, too, a complete decoupling of the drive assembly 2.8 during the coasting mode occurs when power is transmitted only via the power branch described by the bridging clutch 25.8, the internal combustion engine 3.8 is nonetheless coupled in motion in the coasting mode, when the hydrodynamic clutch is filled, via the latter.

The solutions according to FIGS. 7 and 8 are characterized by the connection of the rotor 8.7 or 8.8, respectively, both with the primary blade wheels 11.7, 11.8 and with the input 31 of the bridging clutch, a torsionally rigid coupling 16.7 of the rotor 8.7 with the primary blade wheel 11.7 always existing according to FIG. 7, whereas, according to FIG. 8, it can be broken selectively, that is, at times. For both solutions, when the electrical machine 7.7 or 7.8 is used as the starter, the devices 20.8 or 19.7 are closed, the hydrodynamic clutch is preferably completely, at least, however, partially, emptied, and the bridging clutches 25.7, 25.8 are opened. As a booster, the clutches 5.7, 5.8 are then filled or the bridging clutches 25.7, 25.8 are closed. For energy recuperation in the braking mode or in the coasting mode, the connection between the rotor 8.7 or 8.8 and the drive assembly is cut off; that is, the devices 19.7 and 20.8 are opened. Resulting for the arrangement of vibration dampers are the following possibilities, which are designated for FIG. 7 by the references 33.1 to 33.6 and for FIG. 8 by 33.1 to 33.5. Here, the arrangement of the torsional vibration dampers 33.3 in each case is made between the rotors 8.7 and 8.8 and the input 31 of the bridging clutches 25.7 and 25.8, respectively. The arrangement of the torsional vibration damper 33.4 is made between the bridging clutches 25.7, 25.8 and the coupling with the secondary blade wheels 12.7, 12.8; the arrangement of the torsional vibration damper 33.5 is made between the connection of the output 29.7 or 29.8 of the bridging clutch 25.7 or 25.8, respectively, and the secondary blade wheel 12.7 or 12.8, respectively, with the transmission 9.7 or 9.8, respectively.

The torsional vibration dampers 33.1 are situated downstream from the drive assembly 2.7 or 2.8 and are arranged in the connection of the latter with the connection 16.7 or 16.8, respectively, between the rotor 8.7 or 8.8, respectively, and the primary blade wheel 11.7 or 11.8, respectively. Reference 33.2 denotes the arrangement in front of the rotor 8.7 or 8.8 in the connection 16.7 or 16.8, respectively. Reference 33.3 in FIG. 7 corresponds to an arrangement in front of the connection 16.7, but after the device 19.7, whereas reference 33.3 in FIG. 8 corresponds to an arrangement in the connection 16.8 in front of the device 20.8.

List of Reference Numbers

1; 1.3; 1.4; 1.5; 1.6; 1.7; 1.8 Drive system
2; 2.3; 2.4; 2.5; 2.6; 2.7; 2.8 Drive assembly
3; 3.3; 3.4; 3.5; 3.6; 3.7; 3.8 Internal combustion engine
4; 4.3; 4.4; 4.5; 4.6; 4.7; 4.8 Power transmission unit
5; 5.3; 5.4; 5.5; 5.6; 5.7; 5.8 Hydrodynamic clutch
6; 6.3; 6.4; 6.5; 6.6; 6.7; 6.8 Drive shaft
7; 7.3; 7.4; 7.5; 7.6; 7.7; 7.8 Electrical machine
8; 8.3; 8.4; 8.5; 8.6; 8.7; 8.8 Armature, rotor of the electrical machine
9; 9.3; 9.4; 9.5; 9.6; 9.7; 9.8 Speed/torque converter unit
10; 10.3; 10.4; 10.5; 10.6; 10.7; 10.8 Starting element
11; 11.3; 11.4; 11.5; 11.6; 11.7; 11.8 Primary blade wheel
12; 12.3 Secondary blade wheel
13; 13.3 Torus-shaped operating chamber
14 Device for controlling the filling ratio
15 Device for alternative interruption or realization of the power flow between the electrical machine and the transmission modular unit
16 Connection between the rotor of the electrical machine and the primary blade wheel of the hydrodynamic clutch
17 Device for damping of vibrations
18.1; 18.2; 18.3; 18.4; 18.5 Torsional vibration damper
19; 19.7 Device for the alternative coupling or decoupling of the connection 16 from the drive assembly
20; 20.8 Device for the alternative coupling or decoupling of the rotor from the primary blade wheel
21 Device for the alternative coupling or decoupling
22 Device for the alternative coupling or decoupling of the rotor of the electrical machine from the secondary blade wheel
23 Device for the alternative interruption or realization of the power flow between the drive assembly and the hydrodynamic clutch as well as the electrical machine
24 Starting unit
25 Bridging clutch
26 Engaging and disengaging clutch
27; 27.4 Transmission modular unit
28 Connection between the electrical machine and the secondary blade wheel
29; 29.7; 29.8 Output of the bridging clutch
30 Power branch
31 Input of the bridging clutch
32.1; 32.2; 32.3; 32.4; 32.5 Torsional vibration damper
33.1; 33.2; 33.3; 33.4; 33.5; 33.6 Torsional vibration damper

The invention claimed is:

1. A drive system for a motor vehicle comprising:
a drive assembly;
at least one power transmission unit having at least one starting element and being coupled with said drive assembly; and
an electrical machine having a rotor and being coupled at least indirectly with said drive assembly, wherein said at least one starting element has a hydrodynamic clutch and a bridging clutch, wherein said rotor is coaxial to said hydrodynamic clutch, wherein said rotor is coupleable with said hydrodynamic clutch in a torsionally rigid manner, and wherein said hydrodynamic clutch can be controlled.

2. The drive system of claim 1, wherein said hydrodynamic clutch can be operated when only partially filled with a medium.

3. The drive system of claim 1, further comprising a fill ratio controller that controls a filling ratio of said hydrodynamic clutch.

4. The drive system of claim 1, wherein said hydrodynamic clutch comprises a primary shell, a primary blade wheel, a secondary blade wheel and is free of a guide wheel, wherein said rotor is coupled in a torsionally rigid manner with said primary blade wheel or said rotor is coupleable with said primary shell in a torsionally rigid manner, said primary shell surrounding said secondary blade wheel in an axial direction and partially in a radial direction.

5. The drive system of claim 4, wherein said rotor is operably connected with said primary blade wheel or said primary shell.

6. The drive system of claim 5, wherein said rotor forms an integral modular unit with said primary blade wheel or said primary shell.

7. The drive system of claim 4, further comprising a transmission and a first coupling device, wherein said first coupling device is downstream of said hydrodynamic clutch and can selectively couple or decouple said rotor with said transmission.

8. The drive system of claim 7, wherein said first coupling device is a clutch.

9. The drive system of claim 7, wherein said drive assembly has a drive shaft, and wherein said rotor is connected in a torsionally rigid manner with said drive shaft.

10. The drive system of claim 7, further comprising a second coupling device for coupling or decoupling of said rotor from said drive assembly.

11. The drive system of claim 10, wherein said second coupling device is between said rotor and said primary blade wheel or said primary shell.

12. The drive system of claim 10, further comprising a connection between said rotor and said hydrodynamic clutch, wherein said second coupling device is between said drive assembly and said connection.

13. The drive system of claim 10, wherein said second coupling device is a clutch.

14. The drive system of claim 1, wherein said hydrodynamic clutch comprises a primary blade wheel and a secondary blade wheel and is free of a guide wheel, and wherein said rotor can be connected in a torsionally rigid manner with said secondary blade wheel.

15. The drive system of claim 14, wherein said secondary blade wheel and said rotor are operably connected.

16. The drive system of claim 15, wherein said secondary blade wheel and said rotor are an integral modular unit.

17. The drive system of claim 14, further comprising an internal combustion engine and an interrupting device for interrupting a power flow between said internal combustion engine and said rotor, said interrupting device being actuated at least when said power flow is transmitted via said bridging clutch.

18. The drive system of claim 14, further comprising an internal combustion engine and an interrupting device for interrupting a power flow between said internal combustion engine and said rotor, said interrupting device being actuated at least when said power flow is transmitted via said hydrodynamic clutch.

19. The drive system of claim 17, wherein said interrupting device is defined in part by said bridging clutch.

20. The drive system of claim 17, further comprising a connection between said primary blade wheel and said rotor, wherein said interrupting device has a disengaging device between said drive assembly and said connection.

21. The drive system of claim 17, wherein said interrupting device has a third coupling device for selectively coupling or decoupling of said rotor from said secondary blade wheel.

22. The drive system of claim 17, wherein said interrupting device has a third coupling device for selectively coupling or decoupling of said rotor from said primary blade wheel.

23. The drive system of claim 14, further comprising a vibration damper.

24. The drive system of claim 23, further comprising a connection between said primary blade wheel and said rotor, wherein said vibration damper is between said drive assembly and said connection.

25. The drive system of claim 23, wherein said vibration damper is between said rotor and said primary blade wheel.

26. The drive system of claim 23, wherein said vibration damper is between said rotor and said secondary blade wheel.

27. The drive system of claim 23, wherein said vibration damper is in front of said bridging clutch or after said bridging clutch.

28. The drive system of claim 23, further comprising a connection between said secondary blade wheel and said rotor, wherein said vibration damper is behind said connection.

29. The drive system of claim 23, further comprising a connection between said secondary blade wheel and said bridging clutch, wherein said vibration damper is behind said connection.

30. The drive system of claim 23, wherein said vibration damper is a hydraulic torsional vibration damper.

31. The drive system of claim 1, further comprising a transmission and a starting unit, said transmission being operably connected to said drive assembly, said starting unit being downstream of said transmission, wherein said hydrodynamic clutch is a component of said starting unit.

32. The drive system of claim 31, wherein said starting unit has a casing, wherein said transmission has a housing, and wherein said casing is flange-mounted on said housing to form a modular unit.

33. The drive system of claim 32, wherein said housing of said transmission has a transmission compartment in which said starting unit is integrated into said transmission.

34. The drive system of claim 1, further comprising a transmission operably connected to said drive assembly, wherein said transmission is an automated shift transmission.

35. The drive system of claim 1, further comprising a transmission operably connected to said drive assembly, wherein said transmission is an automatic transmission.

36. The drive system of claims 1, further comprising a transmission operably connected to said drive assembly, wherein said transmission is a CVT transmission.

* * * * *